(12) United States Patent
Polleunis

(10) Patent No.: US 12,284,999 B2
(45) Date of Patent: Apr. 29, 2025

(54) APPARATUS AND METHOD FOR COMBATING CROPS WITH A HEATED AIR FLOW

(71) Applicant: TWC Systems BV, Brussels (BE)

(72) Inventor: Marc Guy Polleunis, Kortenaken (BE)

(73) Assignee: TWC SYSTEMS BV, Brussels (BE)

( * ) Notice: Subject to any disclaimer, the term of this patent is extended or adjusted under 35 U.S.C. 154(b) by 540 days.

(21) Appl. No.: 17/640,038

(22) PCT Filed: Sep. 18, 2020

(86) PCT No.: PCT/EP2020/076201
§ 371 (c)(1),
(2) Date: Mar. 3, 2022

(87) PCT Pub. No.: WO2021/053202
PCT Pub. Date: Mar. 25, 2021

(65) Prior Publication Data
US 2022/0312756 A1    Oct. 6, 2022

(30) Foreign Application Priority Data

Sep. 19, 2019    (BE) .................... 2019/5617

(51) Int. Cl.
F23N 1/00       (2006.01)
A01M 21/04      (2006.01)
(52) U.S. Cl.
CPC ............. *A01M 21/04* (2013.01); *F23N 1/002* (2013.01); *F23N 2229/00* (2020.01)
(58) Field of Classification Search
CPC .. F23N 2225/04; F23N 2225/06; A01M 21/04

USPC ......... 126/271.1, 271.2 R, 271.2 A, 271.2 B, 126/271.2 C
See application file for complete search history.

(56) References Cited

U.S. PATENT DOCUMENTS

| | | | |
|---|---|---|---|
| 3,112,742 A * | 12/1963 | Merz | ...................... A01M 15/00 |
| | | | 126/271.2 C |
| 9,345,239 B2 | 5/2016 | Ballu | |
| 10,028,499 B2 | 7/2018 | Ballu | |
| 10,907,825 B2 | 2/2021 | Polleunis | |
| 2010/0024291 A1 | 2/2010 | Jensen | |
| 2013/0000193 A1 | 1/2013 | Ballu | |

(Continued)

FOREIGN PATENT DOCUMENTS

| | | |
|---|---|---|
| BE | 1024480 A1 | 3/2018 |
| CA | 1142246 A | 3/1983 |

(Continued)

OTHER PUBLICATIONS

Search Report from corresponding Belgian Application No. BE201905617, May 11, 2020.

(Continued)

*Primary Examiner* — Ko-Wei Lin
(74) *Attorney, Agent, or Firm* — Workman Nydegger

(57) ABSTRACT

An apparatus and a method for combating crops with a heated air flow involve a gas burner unit that is only activated if the pressure, the flow rate or the rotational speed of the ventilator is greater than a determined threshold value; and the gas burner unit is again deactivated if the pressure, the flow rate or the rotational speed of the ventilator is less than the determined threshold value.

14 Claims, 16 Drawing Sheets

(56) References Cited

U.S. PATENT DOCUMENTS

2016/0205919 A1    7/2016  Ballu
2019/0203932 A1    7/2019  Polleunis
2020/0383312 A1*  12/2020  Polleunis ............... A01G 13/06

FOREIGN PATENT DOCUMENTS

| CA | 3083980 A1 | 6/2019 |
| DE | 4039359 A1 | 6/1992 |
| EP | 2540162 A1 | 1/2013 |
| JP | 1974-009795 U | 1/1974 |
| JP | H0868533 A | 3/1996 |
| JP | 2013242096 A | 12/2013 |
| WO | 2019115820 A1 | 6/2019 |

OTHER PUBLICATIONS

International Search Report and Written Opinion from PCT Application No. PCT/EP2020/076201, Oct. 29, 2020.
Canadian Office Action from corresponding CA Application No. 3153215, May 4, 2023.

* cited by examiner

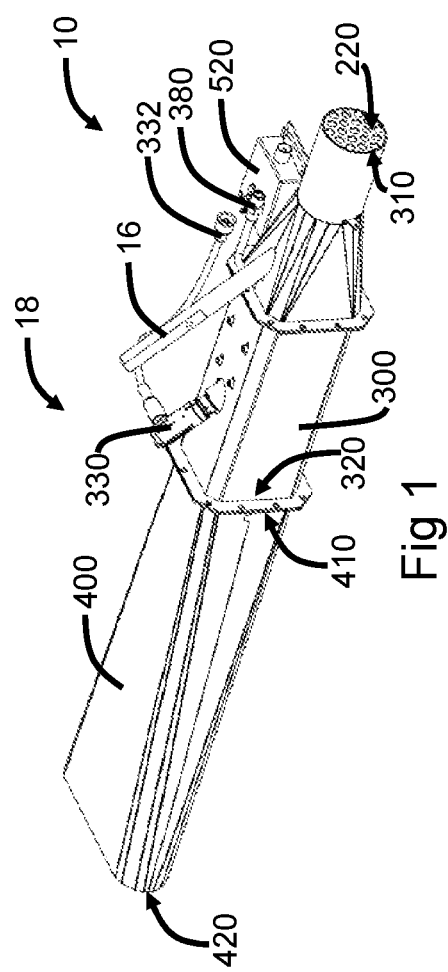

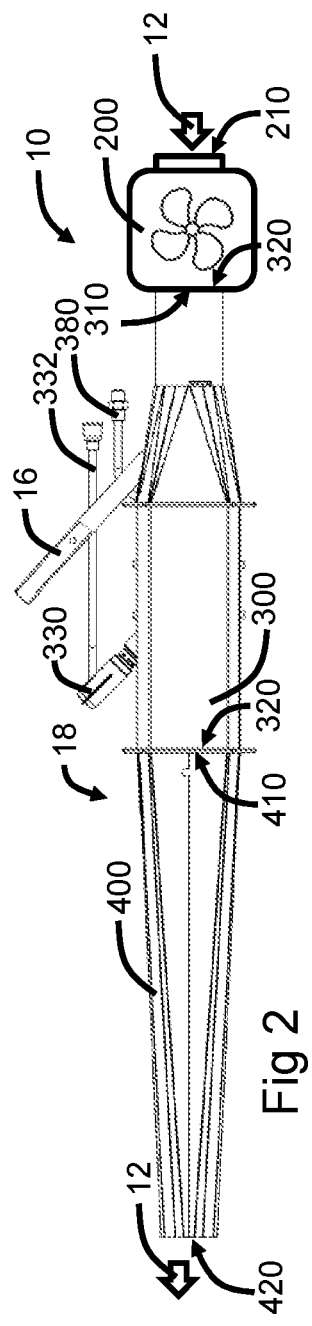
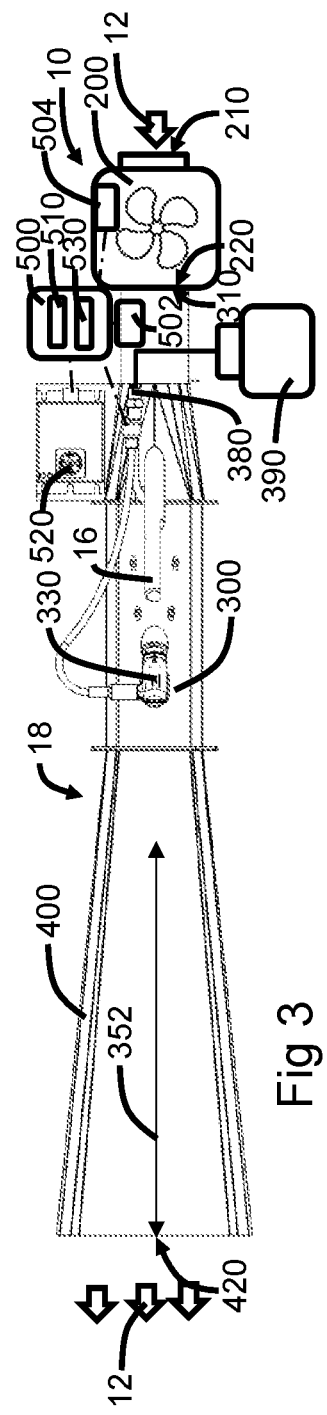

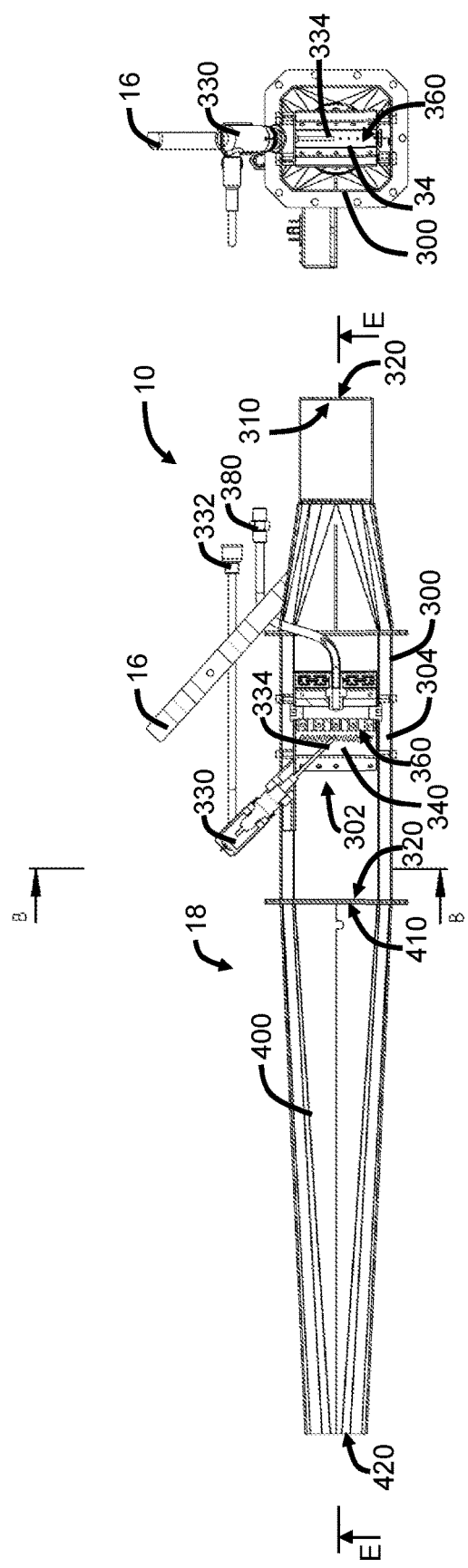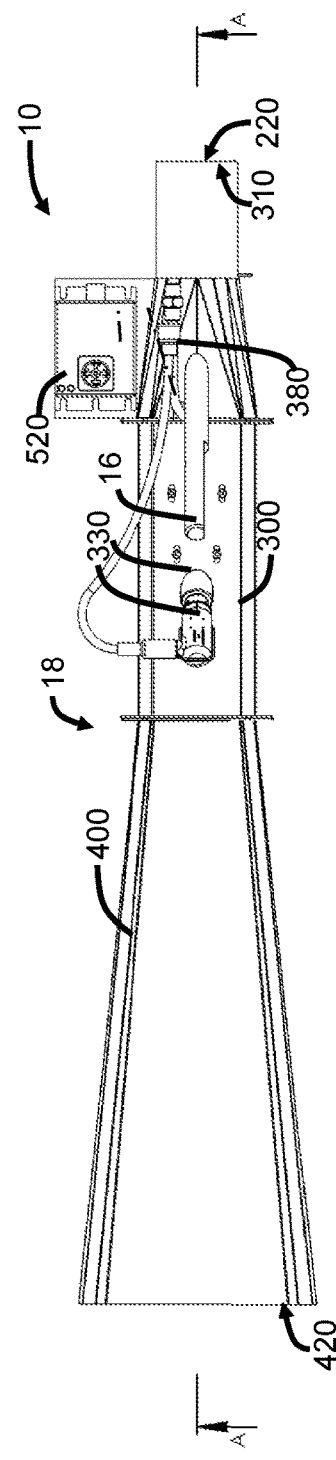
Fig 9
Fig 8
Fig 10

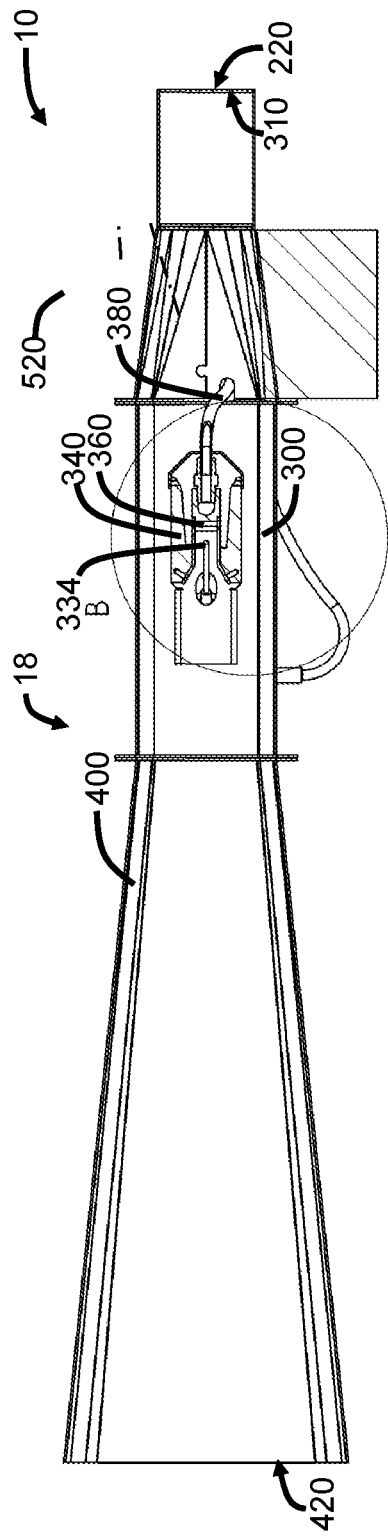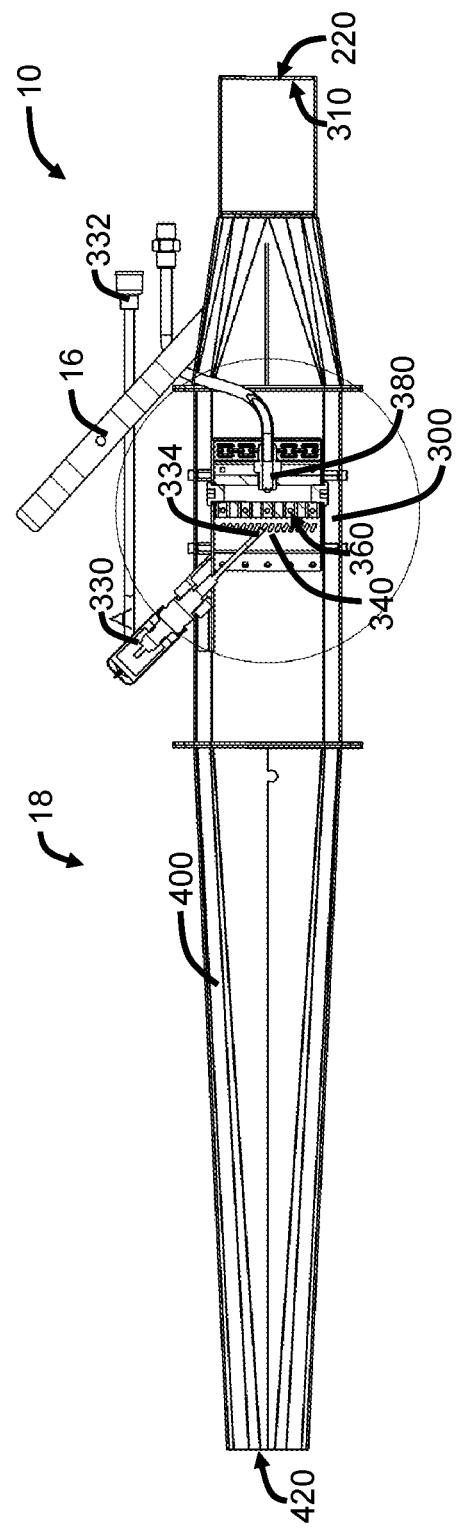
Fig 11
Fig 12

DETAIL A
SCALE 2 : 3

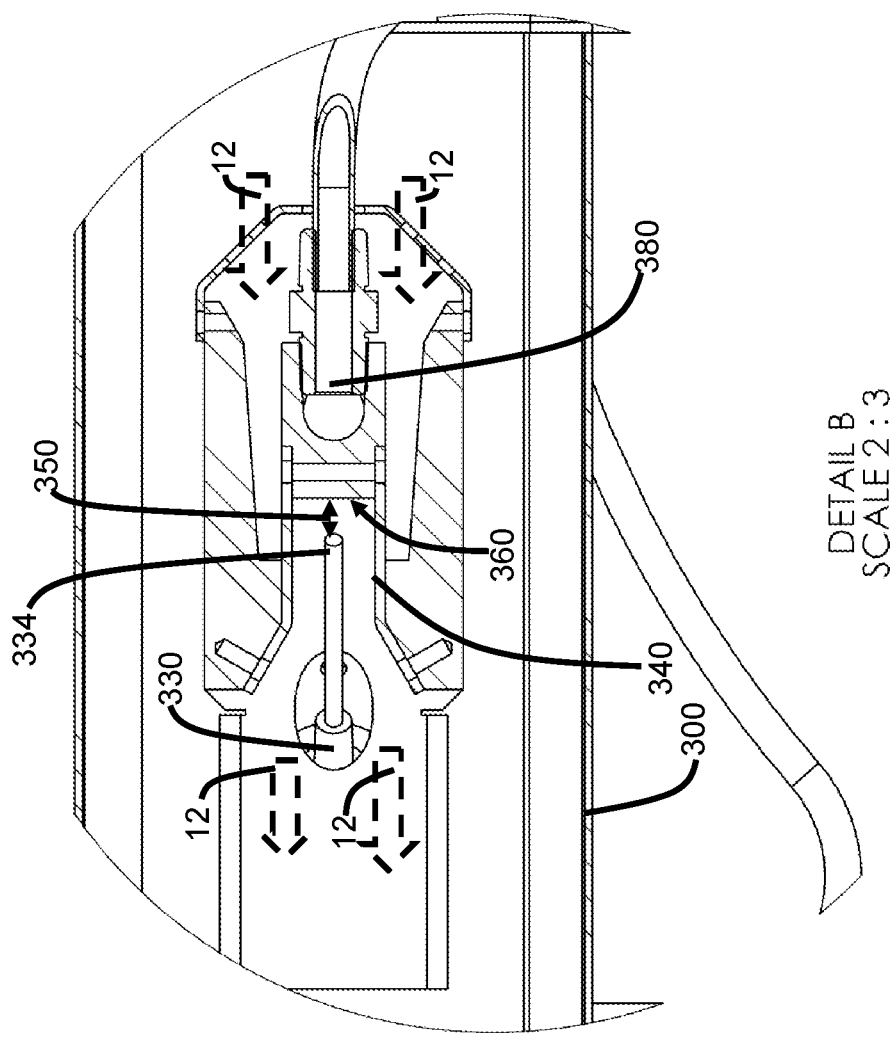

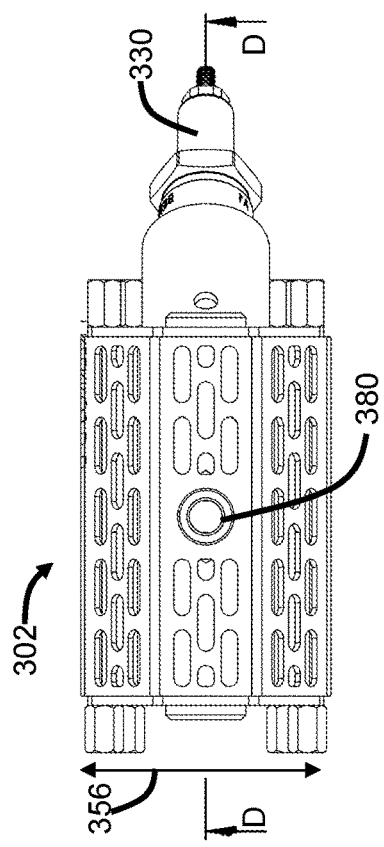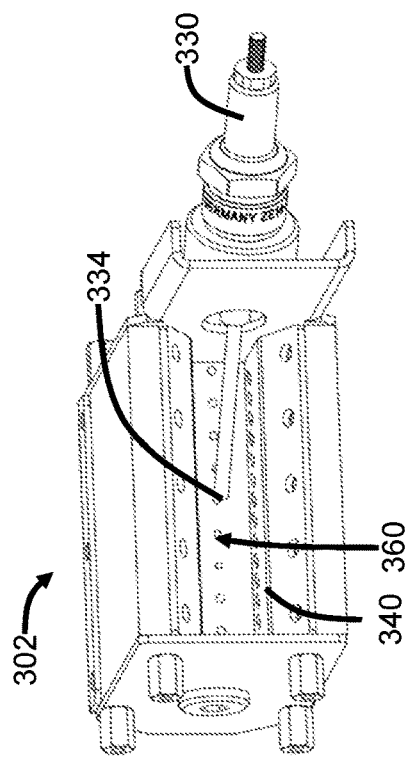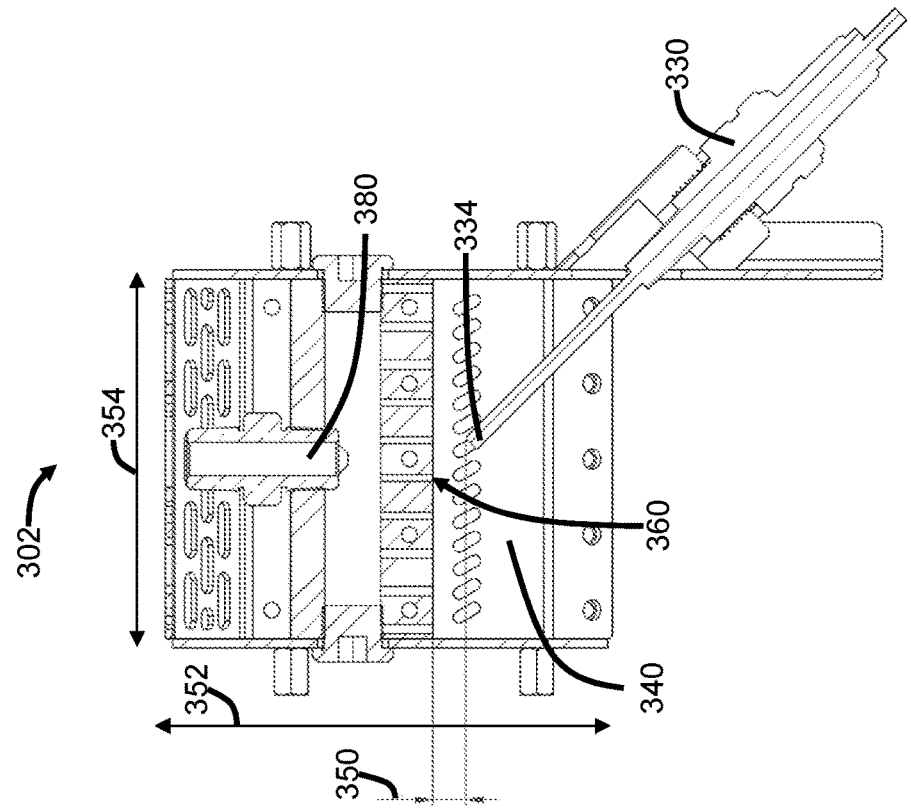

APPARATUS AND METHOD FOR COMBATING CROPS WITH A HEATED AIR FLOW

TECHNICAL FIELD

The invention relates to a method and an apparatus for combating crops by means of a heated gas. More specifically, combating for example weeds by means of a heated gas generated in a burner.

STATE OF THE ART

A method and apparatus for combating weed by means of a heated gas is known, for example, from U.S. Pat. No. 3,112,742. The apparatus contains a burner to generate the heated gas. The burner contains an outflow opening from which the heated gas is guided to the weed to be combatted.

A known disadvantage of such an apparatus is the risk regarding fire safety. As is visible, the burner is located at the outflow opening, so that apart from the heated gas also an open flame exits through the outflow opening to combat the weed. It goes without saying that such a flame can give rise to fire hazard, in particular in an environment where, for example, dried plant material is present. As is visible, in such a burner the air to be heated is supplied to the burner which is positioned close to the outflow opening by means of a ventilator and a guide tube. Apart from the risk of open flames from the outflow opening, there is also the risk of overheating of parts close to the burner which may pose a risk for the safety of the operator, and which may pose a fire hazard even after deactivating the burner.

An alternative method and apparatus for thermally treating weed is also known from US2010/0024291, wherein air is supplied via a ventilator to a burner, after which the heated air flows to the weed via a outflow opening. Here, too, there is a direct path from the burner to the outflow opening, and thus there is a risk of the flame reaching the outflow opening and posing a risk for fire. To reduce the treatment time, preheating is used by guiding air blown from the ventilator by the combustion chamber before it reaches the combustion chamber. This embodiment relates to an apparatus that can be arranged on or at a vehicle, such as, for example, a tractor. Also here exists, apart from the risk of open flames, a risk of overheating of parts arranged near the operator, and which can contact the operator after use of the apparatus.

Furthermore there is also a method and an apparatus for thermally combating crops known from WO2019/115820, wherein a ventilator is arranged between the burner and the discharge channel, so that the ventilator, in operation, draws the heated gas from the burner and discharges it to the discharge channel and exhibits thereby a flame extinguishing effect. Although such an embodiment is advantageous since a high flow rate may be obtained in an efficient way and the risk of open flames is reduced, here, too, remains the risk that certain parts of the apparatus may be too hot after use and pose a risk for an operator. Furthermore, there also still exists the need for also the safety of the apparatuses wherein the ventilator is not arranged between the burner and the discharge channel, but upstream with regard to the burner, so that the risk of open flames is reduced. This is in particular relevant for a portable device, wherein the distance between the parts of the apparatus and the operator is limited and the risk of contact higher.

Thus there is a need for an improved apparatus and method for combating crops of which the safety is increased and the control simplified and wherein the risk of overheating and fire hazard is reduced, thereby allowing for a treatment which proceeds faster and more efficient.

SUMMARY

For this purpose, according to a first aspect of the invention the following is provided: an apparatus for combating crops with heated air comprising:
 a ventilator configured to generate an air flow;
 a gas burner unit configured to heat the air flow generated by the ventilator;
 an outflow channel configured to receive the air flow heated by the gas burner unit and guide it through the outflow channel to an outflow opening where the crops to be combatted are exposed to the heated air flow;
 a controller operatively connected to the gas burner unit, characterised in that:
 the apparatus further comprises a sensor operatively connected to the controller which is arranged in the air flow and is configured to monitor the pressure and/or flow rate of the air flow generated by the ventilator; and that
 the controller is configured to:
  only activate the gas burner unit if the pressure or the flow rate of the air flow generated by the ventilator is more than a determined threshold value; and
  deactivate the gas burner unit again if the pressure and/or the flow rate of the air flow generated by the ventilator is less than the determined threshold value.

In this way, the risk of overheating is reduced, since the burner is only activated after an air flow of which the flow rate and/or the pressure exceeds a predetermined minimum threshold value is present. This ensures the heated air to be continuously discharged to the outflow opening with a guaranteed minimum flow rate and the risk of local overheating of the air and/or certain parts of the apparatus to be reduced. Furthermore, the burner is also automatically deactivated by the controller when the flow rate of the air flow drops below the flow rate of this predetermined minimum threshold value. Thus, at deactivating the apparatus, the burner is guaranteed to not remain activated at an insufficiently high flow rate of the air flow to discharge the heat in the direction of the outflow opening. This improves the safety of the apparatus, as well as the risk of fire hazard, since the risk of local overheating of certain parts of the apparat is reduced, also at deactivating the apparatus. The use of a sensor for measuring the pressure and/or the flow rate generated by the ventilator, offers the advantage that such a sensor functions independently of the type of ventilator used.

According to an embodiment, an apparatus is provided, wherein
 the apparatus further comprises a sensor operatively connected to the controller configured to monitor the rotational speed of the ventilator; and that
 the controller is further configured to:
  only activate the gas burner unit if the rotational speed of the ventilator is greater than a determined threshold value; and
  deactivate the gas burner unit again if the rotational speed of the ventilator is less than the determined threshold value.

In this way, the risk of overheating is also reduced, since the burner is only activated after an air flow of which the flow rate and/or the pressure exceeds a predetermined minimum threshold value is present.

According to an embodiment, an apparatus is provided, wherein the apparatus further comprises a operating element coupled to the controller which is configured to:
- activate and deactivate the ventilator; and/or
- control the rotational speed of the ventilator, and wherein the controller is further configured to control the gas burner unit in function of the sensor for the pressure and/or the flow rate of the generated air flow and/or the sensor for the rotational speed of the ventilator.

In this way, a simple and safe control is achieved.

According to a further embodiment, an apparatus is provided, wherein the controller is further configured to run the ventilator at a determined idle rotational speed that is lower than the determined threshold value, at least for a determined period of time after deactivation of the burner.

In this way, a fast and safe start of the apparatus can be achieved, which allows for an efficient use.

According to a further embodiment, an apparatus is provided, wherein the apparatus further comprises at least one flame detector coupled to the controller which is positioned in the combustion chamber of the gas burner of the gas burner unit at a determined distance from the fuel input:
- wherein this determined distance is sufficiently large, so that a flame, of which the flame front is not reaching beyond a determined distance upstream of the outflow opening, is detected; and
- wherein this determined distance is sufficiently small, so that a flame, of which the flame front is reaching beyond this determined distance upstream of the outflow opening is not detected, since the distance to the base of such a flame is greater than this determined distance; and
- wherein the controller is configured to the gas burner unit if the flame detector is not detecting a flame.

In this way, the risk of flames reaching the outflow opening is reduced.

According to a further embodiment, an apparatus is provided wherein the flame detector comprises an ionisation sensor.

This allows to establish the flame detector in a reliable and simple way.

According to a second aspect of the invention, an assembly is provided for the use in an apparatus according to the first aspect of the invention, wherein:
- the assembly comprises the gas burner unit and the outflow channel coupled thereto;
- the assembly forms a one-part portable unit and further comprises a handle configured to hold the assembly by hand and to carry it by hand during operation;
- the length of the gas burner of the burner unit according to the flow direction of the air flow is in the range of 5-25 cm; and
- the length of the outflow channel according to the flow direction of the air flow is in the range of 50 cm-200 cm.

This ensures an efficient manufacture of the apparatus, for example with the help of an existing ventilator and a suitable controller.

According to a third aspect of the invention, a method is provided for controlling an apparatus according to the first aspect of the invention, wherein the controller:
- only activates the gas burner unit if the pressure or the flow rate of the air flow generated by the ventilator is greater than a determined threshold value; and
- deactivates the gas burner unit again if the pressure and/or the flow rate of the air flow generated by the ventilator is less than the determined threshold value.

According to an embodiment, a method is provided, wherein the controller:
- only activates the gas burner unit if the rotational speed of the ventilator is larger than a predetermined threshold value; and
- deactivates the gas burner unit again if the rotational speed of the ventilator is smaller than the predetermined threshold value.

According to a further embodiment, a method is provided, wherein the controller controls the gas burner unit in function of the sensor for the pressure and/or the flow rate of the generated air flow and/or the sensor for the rotational speed of the ventilator.

According to a further embodiment, a method is provided, wherein the controller, causes the ventilator to run at a determined idle rotational speed that is lower than the determined threshold value, at least for a determined period of time after deactivation of the burner.

According to a further embodiment of the invention, a method is provided, wherein the controller deactivates the burner if a flame detector is not detecting a flame, and wherein the flame detector is positioned in the combustion chamber of the gas burner of the gas burner unit at a determined distance of the fuel input:
- wherein this determined distance is sufficiently large, so that a flame, of which the flame front is not reaching beyond a determined distance upstream of the outflow opening, is detected; and
- wherein this determined distance is sufficiently small so that a flame, of which the flame front is reaching beyond this determined distance upstream of the outflow opening is not detected, since the distance to the base of such a flame is larger than this determined distance.

According to a further embodiment of the invention, a method is provided, wherein the flame detector comprises an ionisation sensor.

According to a fourth aspect of the invention, a method for manufacturing the apparatus according to the first aspect of the invention is provided, wherein:
- the gas burner unit and the outflow channel coupled thereto are manufactured as an assembly;
- the assembly is manufactured as a one-part portable unit which comprises a handle configured to hold the assembly by hand and carry it by hand during operation;
- the length of the gas burner of the gas burner unit according to the flow direction of the air flow is in the range of 5-25 cm; and
- the length of the outflow channel according to the outflow direction of the air flow is in the range of 50 cm-200 cm.

DESCRIPTION

By way of example, a number of embodiments will be described with reference to the accompanying Figures, wherein:

FIGS. 1-14 show different views, cross sections and detailed views of an embodiment of the apparatus according to the invention;

FIGS. 15-21 show in more detail an embodiment of a gas burner as used in the apparatus of FIGS. 1-14;

Figure 4:
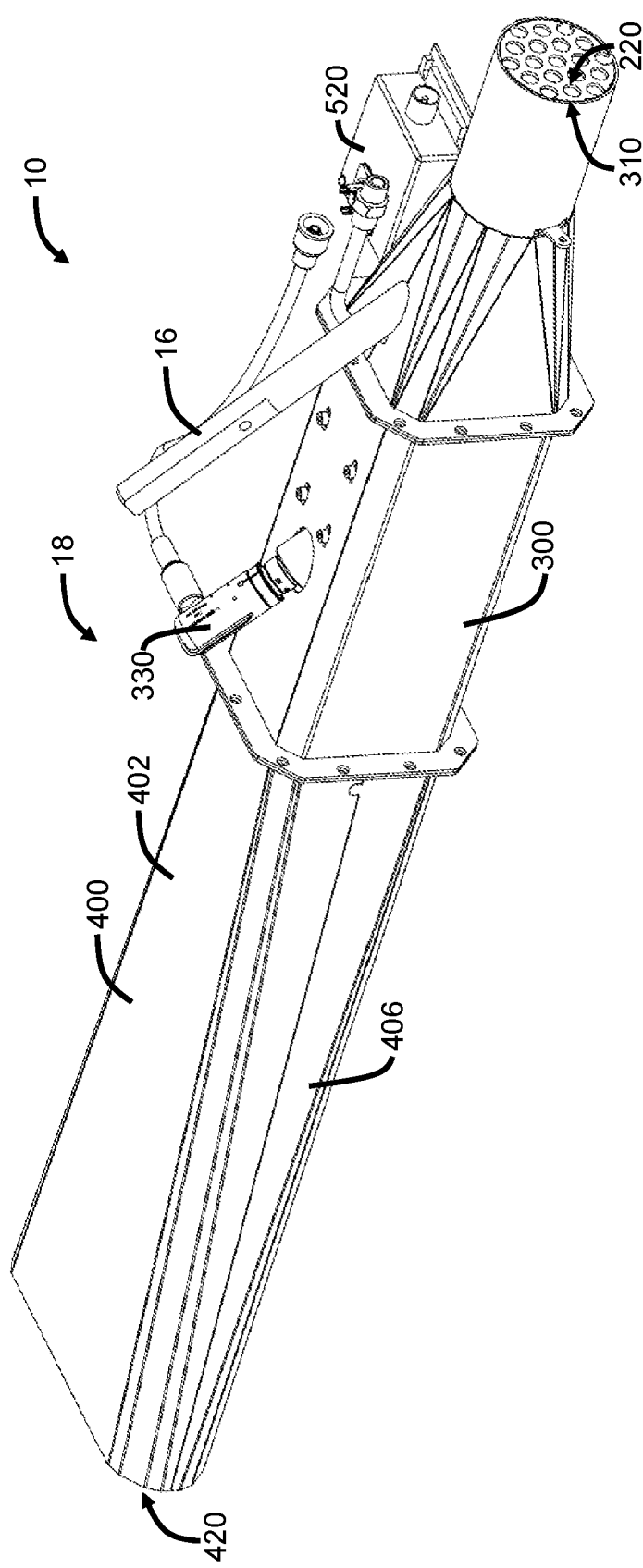
Figure 5:
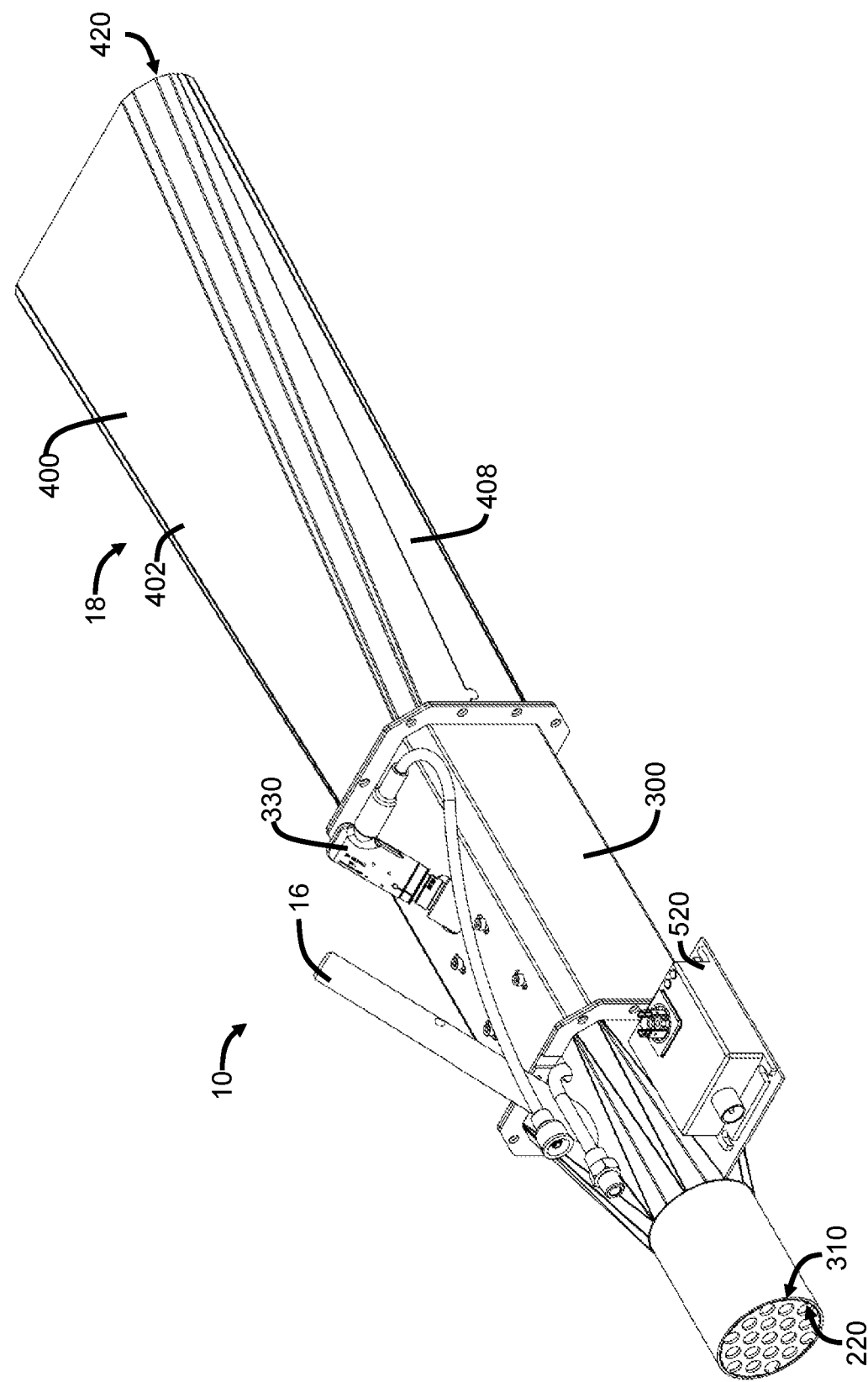
Figure 6:
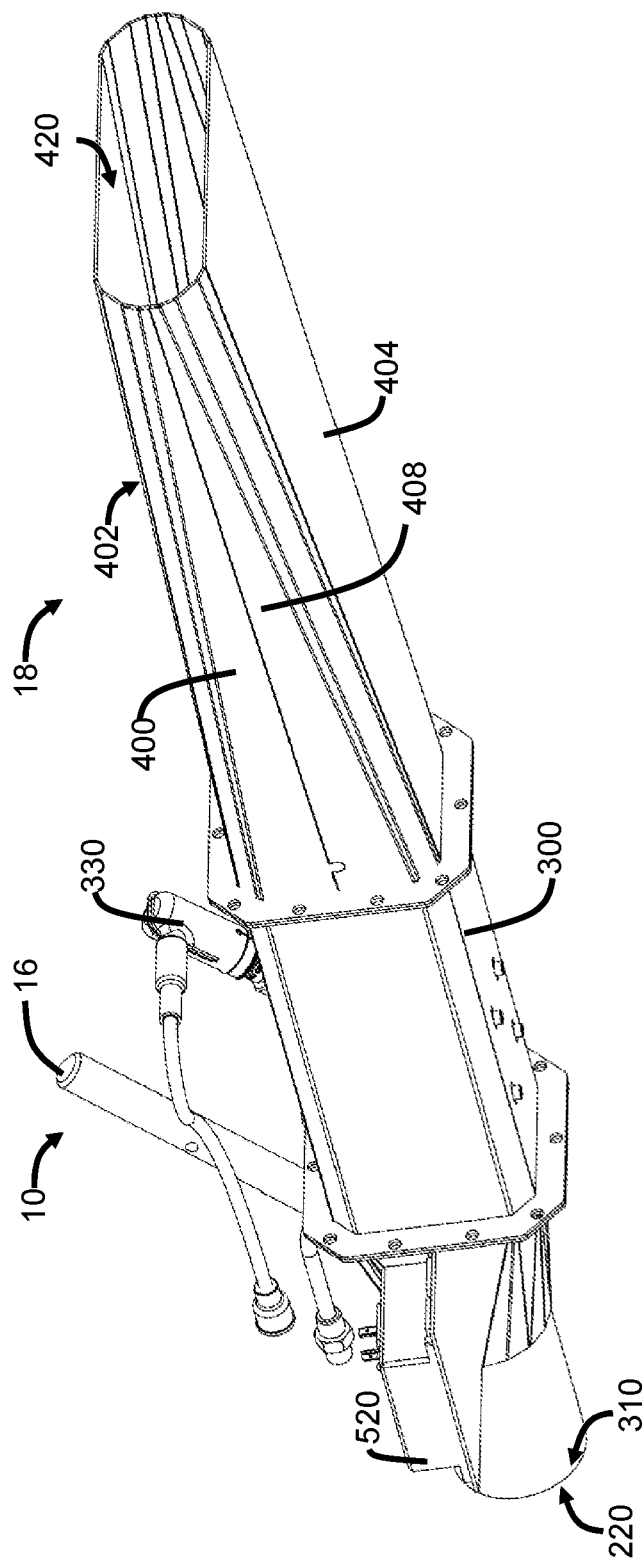
Figure 7:
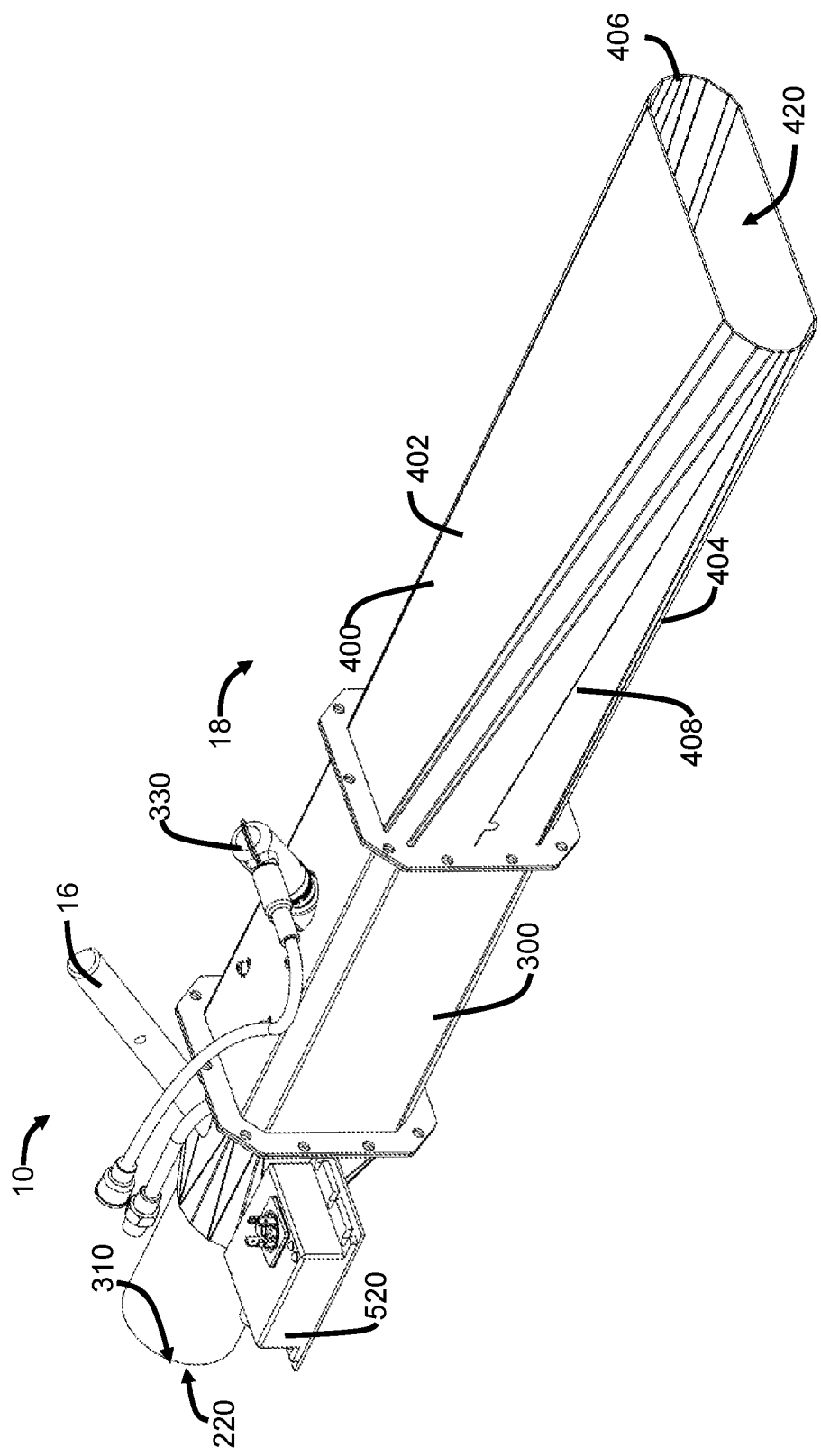
Figure 13:
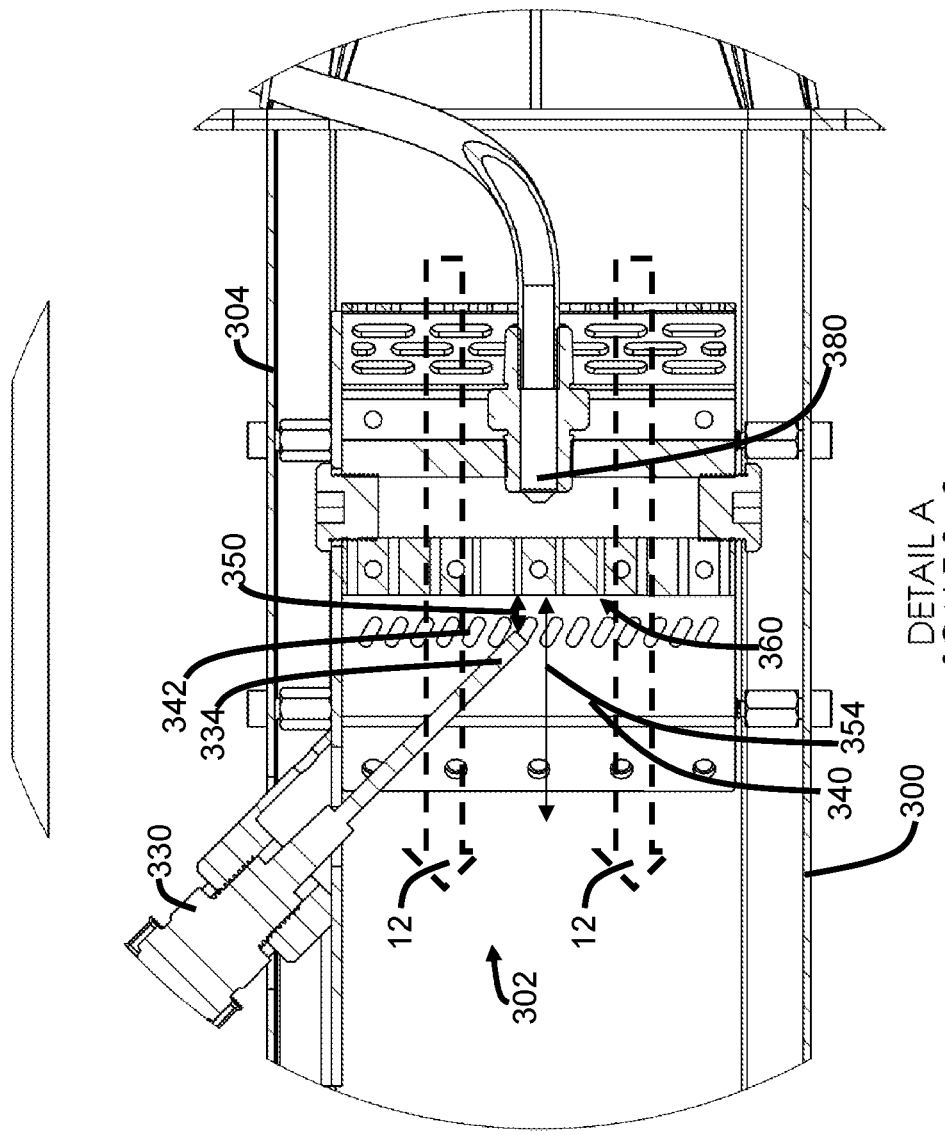
Figure 16:
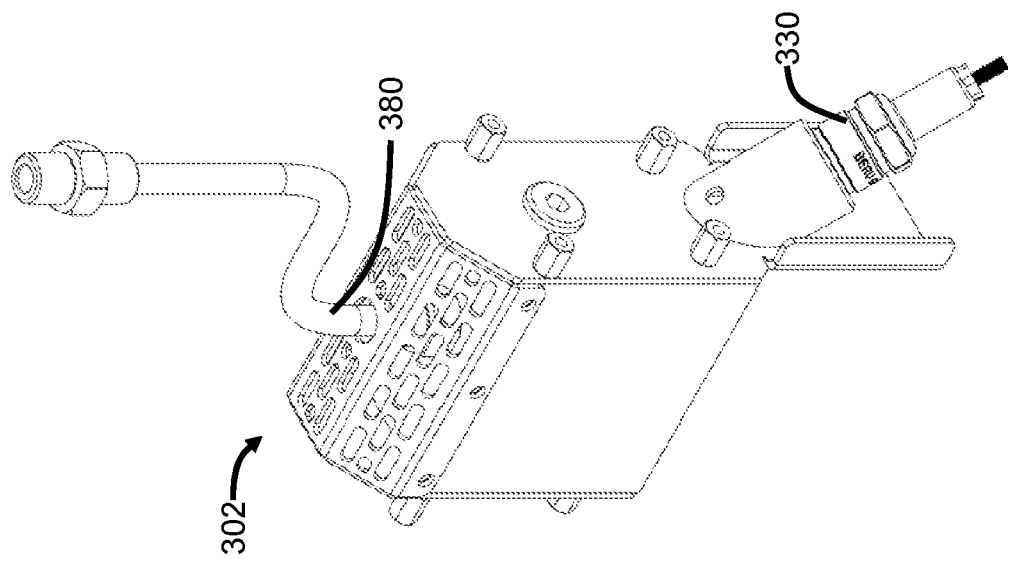
Figure 15:
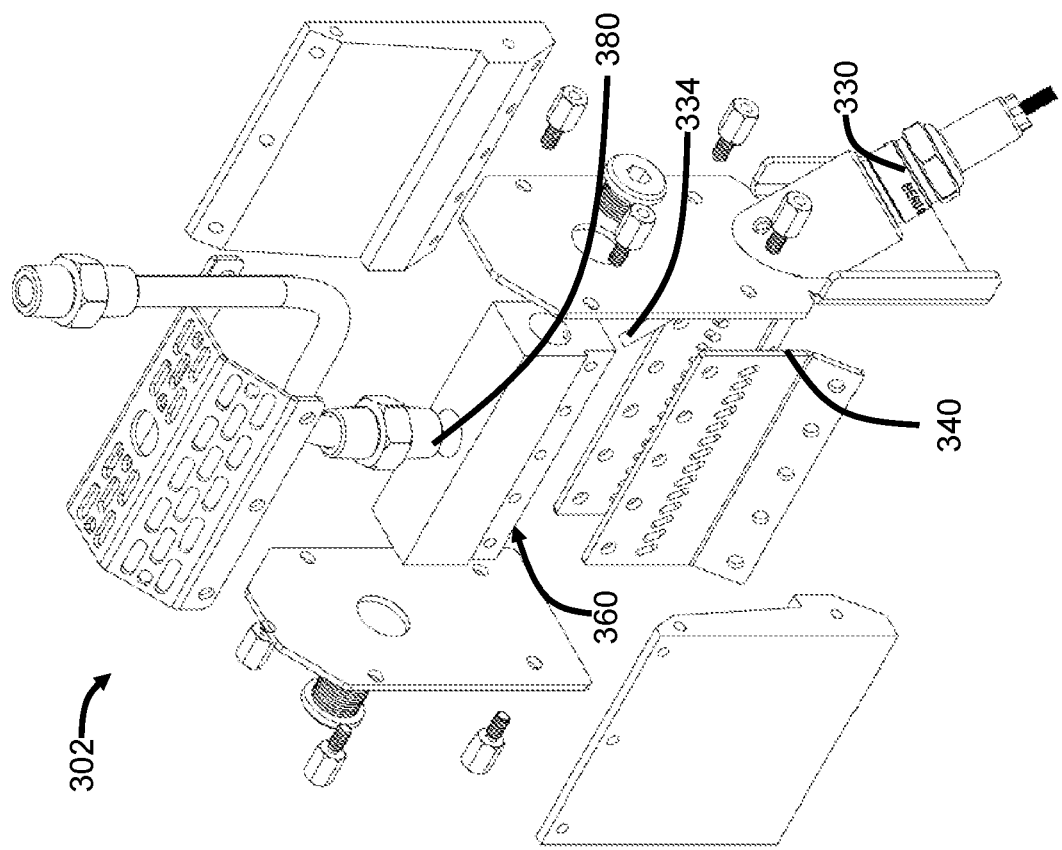
Figure 21:
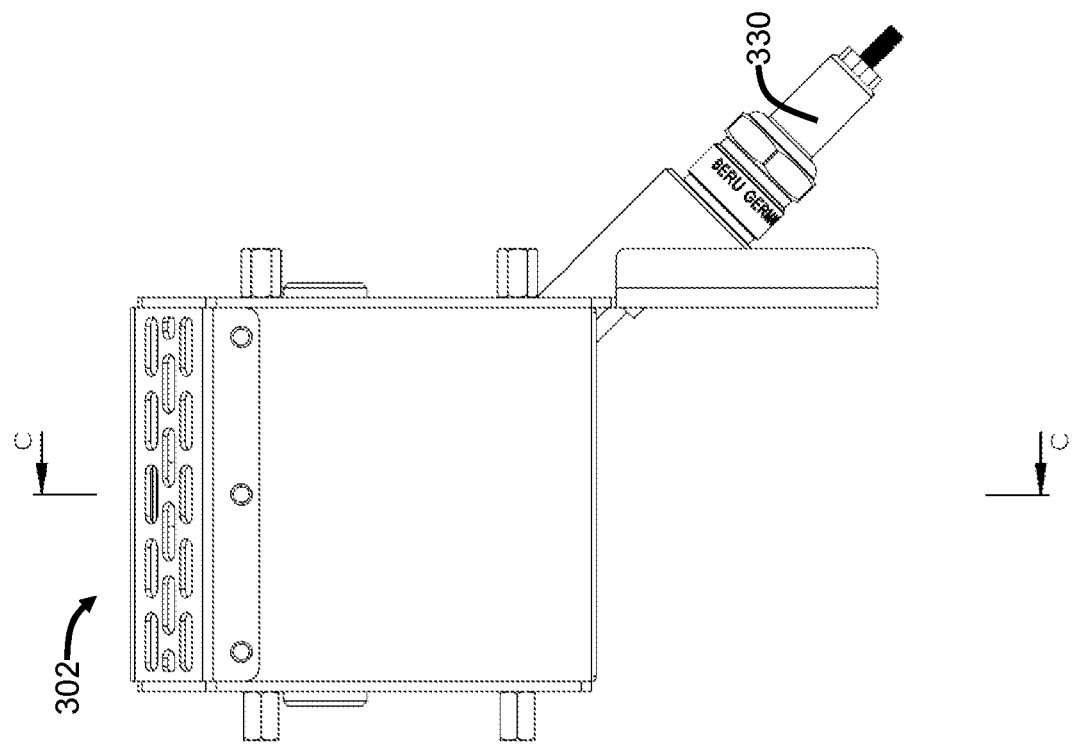
Figure 20:
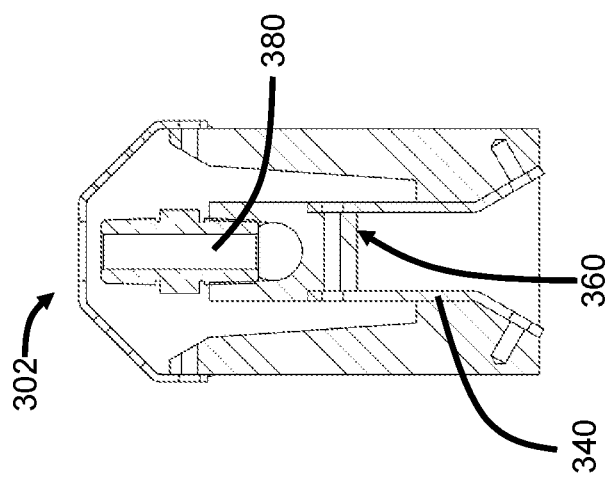

An embodiment of the apparatus 10 is schematically shown in FIGS. 1-14, wherein FIG. 1 shows a perspective view, FIG. 2 shows a side view and FIG. 3 shows a top view. FIGS. 4-7 show different schematic perspective views of this embodiment of the apparatus 10 viewed from different angles. FIG. 8 schematically shows a longitudinal cross section along line A-A in the top view of FIG. 10 of this embodiment. FIG. 9 schematically shows a cross section along line B-B in FIG. 8. FIG. 11 shows a longitudinal cross section along line E-E in FIG. 8. FIG. 12 shows a longitudinal cross section similar to FIG. 8. FIG. 13 shows a detail view of section A in FIG. 12, and FIG. 14 shows a detail view of section B in FIG. 11. FIG. 15 shows an exploded view and FIG. 16 shows a composite drawing of an embodiment of the burner 302 of the burner unit 300 of the apparatus 10 of FIGS. 1-14. FIG. 17 shows a cross section through the top view of the burner of FIG. 18 along line D-D. FIG. 19 shows a perspective view of the burner seen from below. FIG. 20 shows a cross section along the line C-C of the side view of the burner in FIG. 21. It is clear that alternative embodiments of the apparatus 10 as shown in the Figures are possible. However, the illustrated embodiment is shown to scale and dimensions and proportions are advantageous especially when the apparatus is used as a portable device.

It is clear that in use, the apparatus 10, similarly as for example known from WO2019/115820, an outflow opening 420 of an outflow channel 400 is directed towards the crop 12 to be combatted so that the heated air flow can flow in the direction of the crop 14 from the outflow opening 420. It is thus clear that the outflow channel 400 and the outflow opening 420 are directed in such a way that the air flow is directed to the soil where the crop 14 to be combatted is located, as shown, for example, in FIG. 22. Such crops may, for example, comprise weed or other unwanted crops or plant material which is desired to be combatted or destroyed by means of exposure to the heat of the heated gas 20.

As visible in FIGS. 1-14, the apparatus 10 comprises a gas burner unit 300, which comprises, for example, a gas burner or any other suitable burner burning a suitable fuel, to generate heat by burning a fuel, such as, for example, a suitable combustible gas, preferably propane. According to the shown embodiment, the gas burner unit 300 is configured to heat an air flow 12 and thereby generate a heated air flow 12. To this end, according to the example shown, the air flow 12 is supplied via an inlet opening 310 of the burner 300, after which the burner 300 heats this air flow via an inlet opening 310 of a burner 300, after which the burner 300 heats this air flow through a suitable combustion element such as, for example, a gas combustion element where supplied gas is burned after ignition by a suitable ignition mechanism. Subsequently, the air flow 12 heated by the burner 300 is discharged through the outlet opening 320. As further on is described in more detail according to such an embodiment, the heated air flow is thus the ambient air heated by the burner 30, which is supplied by a ventilator 200. According to the exemplary embodiment shown, the ventilator 200 is coupled to the burner at the side of the inlet opening 310, however, according to alternative exemplary embodiments, it is however that the ventilator 200 is coupled to the burner 200 at the side of the outlet opening and/or through suitable supply channels and/or discharge channels for an air flow 12. It is therein clear that such a ventilator 200 is coupled in such a way to the burner 300 that the air flow 12 generated by the ventilator 200 may flow through the burner 300 to be heated there. In addition, the ventilator 200 may be located both upstream and downstream of the burner 300. It is furthermore clear that the air flow 12 may also optionally comprise other components than the ambient air, such as, for example, combustion gases generated by the burner 300 or other suitable additives for combatting crops.

As furthermore visible in FIGS. 1-14, the apparatus 1 further comprises a ventilator 200. Such a ventilator 200 or blower, as known to those skilled in the art, is configured to generate an air flow by rotating the ventilator blades at a certain rotational speed. A higher rotational speed generates an air flow with a higher flow rate and/or pressure and a lower rotational speed generates an air flow with a lower flow rate and/or pressure. As is visible, the shown embodiment of the ventilator 200 comprises an inlet opening 210 and an outlet opening 220.

The inlet opening 310 of the burner 300 is then connected to the outlet opening 220 of the ventilator 200 for supplying the air flow to be heated by the burner 300. The inlet opening 210 of the ventilator 200 draws in an air flow 12 from the ambient air as shown. It is clear that the ventilator 200, in operation, i.e. when activated or driven by a suitable drive, such as, for example, a suitable electric engine, combustion engine, gas engine, etc., generates an air flow 12 which is supplied to the burner 300 according to a downstream direction. When the burner 300 is in operation, i.e. in a burning or activated state, this air flow supplied by the ventilator, is then heated in the burner 300 to a heated air flow 12 which is subsequently downstream supplied through the outflow opening 320 of the burner 300 to the outflow channel 400. It is clear that this air flow 12 from the ventilator 200 and through the burner 300 to the outflow channel 400 also causes suction of air flow 12 of new ambient air through the inlet opening 210 of the ventilator.

According to the embodiment of FIGS. 1-14, the apparatus 10 also comprises an outflow channel 400. As visible, the outflow channel 400 comprises an inlet opening 410 and an outflow opening 420. In addition, the inlet opening 410 of the outflow channel 400 is connected to the outlet opening 320 of the burner 300. The outflow channel 400 is, for example, executed as a tubular structure, an air flow guiding channel, or another suitable embodiment of a closed circuit for the heated air flow 12 from the inlet opening 410 to the outflow opening 420. At the level of the outflow opening 420, the heated air flow 12 flows from the outflow channel outwards where the crops 14 to be combatted are exposed to the heated air flow 12 as shown, for example, in FIG. 22. Although the outflow channel 400 of the shown embodiment shows a simple structure with a single inlet opening 410 and a single outlet opening 420, it is clear that alternative embodiments are possible, wherein the outflow channel 400 may form a closed circuit wherein heated air is guided from one or more inlet openings to one or more outflow openings 420 for treating crops 14. Generally, the outflow channel comprises 400, therefore, at least one outlet opening 420 configured to supply the heated air flow 12 to the crops 14 to be combatted.

As shown in FIGS. 1-4, the shown embodiment of outflow channel 400 of the apparatus 10 comprises a conical reduction of the side walls of the outflow channel and a similar widening of the top and bottom walls of the outflow channel 400. As a result, the outflow opening 420 is elongated, i.e. with side walls 406, 408 that are smaller than the top wall 402 and bottom wall 404, allowing the heated air flow to be sufficiently focused on the crops to be combatted when combatting crops in separate locations. It is clear that this also widens the outflow opening 420, so that during a continuous treatment along a strip of soil with crops to be combatted, for a passage of the outflow opening 420 an of the outflow channel 420 a larger surface is treated with the heated air. This widening of the outflow channel 400 in the downstream direction is preferably such that the flow of the heated air from the burner 300 is not hindered and there is preferably no great increase in the pressure at the outlet opening 310 of the burner 300, or in other words, the cross section of the outflow channel 400 from the inlet opening 410 of the discharge channel 400 to its outlet opening 420 remains, for example, substantially constant. It is clear, however, that alternative embodiments are possible where the cross section increases or decreases by, for example, a maximum of 10%, preferably a maximum of 5%.

It is clear, however, that alternative embodiments are possible, in particular wherein the ventilator 200 is arranged downstream of the burner 300, with a reduction in the cross section of the outflow channel 400 showing a suitable constriction, for example in the range of 5%-75%, similar as described in WO2019/11582. Such a conical reduction causes a certain pressure increase in the heated air flow at the level of the outlet opening 320 of the burner 50. This provides a certain flame-extinguishing effect. However, such apparatuses require a ventilator with a metal housing and a metal impeller, which is a disadvantage for the weight of a portable device.

In the shown embodiment, it is clear that the ventilator 200 is arranged upstream relative to the burner 300, so that the ventilator 200 does not come into contact with a heated air flow, but with a lower temperature air flow, allowing use of, for example, lighter materials, such as, for example, a suitable plastic for the housing and/or the impeller, which are less resistant to higher temperatures. In other words, the burner 300 is located on the pressure side of the ventilator 200, or in other words, the upstream side of the burner 300 is slightly higher than the downstream side of the burner 300.

In addition, according to the shown embodiment, it is also clear that only the burner 300 and the outflow channel must be manufactured of materials, such as, for example, a suitable metal which can withstand the higher temperatures of the heated air flow, which are, for example, in the range between 150° C. and 400° C. All upstream parts of the burner, such as the ventilator 200, all supply channels between the ventilator and the burner, and/or upstream of the ventilator 200, are exposed only to the ambient air which is of a lower temperature. Hereby the number of parts of the portable burner exposed to a higher temperature is reduced, and thus the safety risk associated with such parts is also reduced.

The ventilator 200 can comprise any suitable type of ventilator, such as, for example, an axial ventilator, a centrifugal ventilator, etc. The burner can be executed as any type of suitable gas burner, such as, for example, a gas burner operating on propane, however, according to alternative embodiments any other type of gas burner using a suitable gaseous fuel, such as, for example, butane, natural gas, etc., may be employed.

The shown embodiment is particularly suitable to be used as a portable apparatus 10 and, as shown, comprises a handle 16 arranged on the housing of the burner for carrying and/or manipulating the apparatus 10 by an operator. The dimensions of the shown embodiment of the apparatus 10 correspond approximately to the dimensions of, for example, a leaf blower. It is further clear that the use of an apparatus 10 as described above for combatting crops by means of a heated air flow 12, suitably blows the heated air downward onto the crop 14 to be combatted. That is, the apparatus 10 discharges the heated air flow 12 from the outflow opening 420 of the outflow channel 400 in a downward direction, which faces the ground surface. That is, at an appropriate angle to the ground surface which is in the range of 30°-150°, preferably 60°-120°, for example 75°-105°, for example 90°+/−5° relative to the ground surface.

As further visible in FIGS. 1-14, and more specifically as schematically shown in FIG. 3, the embodiment of the apparatus 10 further comprises a controller 500 operatively connected to the ventilator 200 and gas burner unit 300. Furthermore, the apparatus 10 according to the shown embodiment comprises an sensor 502 operatively connected to the controller 500 which is arranged in the air flow 12 and which is configured to monitor the pressure and/or the flow rate of the air flow 12 generated by ventilator 200. Such a sensor is, for example, a suitable pressure sensor that can measure a pressure in the range from 0 bar-2 bar, or, for example, a suitable pressure switch, for example an adjustable pressure switch that switches or emits a signal when a pressure in the range of 0.05 bar-1.5 bar, preferably in the range from 0.1 bar-0.5 bar, is exceeded. Such a pressure sensor 502 offers the advantage that it can be easily arranged in the air flow generated by the ventilator and that it can continue to function unchanged independently of the type of ventilator used in conjunction with the controller. According to alternative embodiments, in addition to or instead of the pressure sensor, the apparatus may comprise a suitable sensor 502 for the flow rate of the air flow generated by the ventilator and/or a suitable sensor 504 configured for monitoring the rotational speed of the ventilator 200. The controller 500 controls the apparatus 10 so that the gas burner unit 300 is only activated if the pressure, the flow rate and/or rotational speed of the ventilator 200 as determined by the sensors 502, 504 is greater than a determined threshold value 510. The controller 500 controls the apparatus 10 also so that the gas burner unit 300 is deactivated again if the pressure, the flow rate and/or rotational speed of the ventilator 200 is less than the determined threshold value 510. This determined threshold value is, for example, a determined minimum pressure, for example in the range from 0.05 bar-0.5 bar, a determined minimum flow rate in the range from 0.2 m$^3$/s-5 m$^3$/s, and/or a determined minimum rotational speed that is greater than 2%, for example greater than 5%, for example 10% or higher, 20% or higher of the maximum rotational speed of the ventilator 200. When the ventilator 200 is driven by a combustion engine, the threshold value is preferably greater than a certain idle rotational speed 540 which is maintained by the controller 500 during a period in which no crops have to be combatted, but in which the apparatus 10 has nevertheless already been activated and is kept ready to combat crops. The above ensures that overheating is avoided at the start of the apparatus 10, since a suitable air flow is always present at the ignition of the burner 300. Furthermore, it also ensures a particularly simple and safe control of the apparatus 10, since the operator only has to activate or deactivate the ventilator and/or control its rotational speed, whereby the controller will automatically activate and deactivate the burner in a safe manner. As shown, the apparatus 10 comprises therefore, for example, a suitable operating element 520 coupled to the controller 500 to activate and deactivate the ventilator 200 and/or to control the rotational speed of the ventilator 200. It is thereby advantageous that the controller 500 also controls the gas burner unit 300 in function of the rotational speed of the ventilator 200, in order to increase, for example, the gas supply at a higher rotational speed of the ventilator. In order to even further reduce the risk of overheating and to increase safety even further, it is preferable for the controller 500 to run the ventilator 200 for at least a determined period of time 530, at a determined idle rotational speed 540 which is lower than the determined threshold value 510.

The gas burner unit 300 includes a gas burner 302 arranged in the housing 304 of the gas burner unit 300. The embodiment of this gas burner 302 preferably functions similar to the gas burner known from BE1024480, but is executed smaller and more compact. BE1024480 is incorporated herein by reference. Such a gas burner 302 of the burner unit 300 comprises a burner tube, into which gas is supplied and which is provided with a row of linearly arranged perforations which form an inlet 360 for the fuel in a burner chamber 340. Furthermore, the gas burner 302 comprises according to the shown embodiment an ignition mechanism 330 to electrically ignite the gas, according to this embodiment, this ignition mechanism also comprises the flame detector 330, however, it is clear that alternative embodiments are possible in which the flame detector and the ignition mechanism are separate elements. As known from BE1024480, the burner tube is provided on the inside with a gas distribution tube to distribute the gas supply evenly over the entire row of perforations and the burner chamber 340 is additionally surrounded by a pre-assembled air chamber, which is connected to the burner chamber by means of air slots 342. As shown, these air slots 342 are preferably inclined relative to the longitudinal axis of the burner tube at an angle between 10° and 80°. The air supply through the air slots is controlled by the ventilator 200 controlled by the controller 500, which, according to the shown embodiment, blows air through the pre-assembled air chamber.

As shown in FIGS. 8-22, gas is supplied through a supply line 380 from a gas reservoir, such as, for example, a suitable gas bottle, to a burner tube that evenly supplies gas to each of the perforations in the burner tube forming the inlet 360 of the gas, along which the gas flows into the combustion chamber 340 and is mixed with air. As described above, the gas burner 302 is ignited under control of the controller 500, or in other words activated, by the electric igniter, which is executed as an ignition candle, which ignites the gas/air mixture at the perforations of the burner tube and which also comprises a flame detector 330, after a suitable sensor 502 detects that the pressure and/or the flow rate of air flow generated by the ventilator, and/or a sensor 504 indicates that the ventilator 200 reaches a rotational speed greater than the determined threshold value 510. The combustion is self-sustaining and can be maintained even with slight underpressure of the gas or high air velocity, or large and frequent variations in air velocity as long as there is gas supply. According to the shown embodiment of the gas burner 302, the dimensions are shown to scale in the Figures and the dimensions 352, 354 and 356 in FIGS. 17 and 18 are 95 mm, 80 mm and 53 mm respectively. After the activation of the gas burner 302, the flame detector 330, which is, for example, a suitable ionization sensor 334, is monitored by the controller 500 which is connected to the flame detector 330 through an electrical line 332. As long as the shown gas burner 302 generates flames between 5 cm and 15 cm in length, the ionization sensor 334 arranged at a distance 350 of 7 mm from the inlet 360 will detect a flame. If there is no flame, the ionization sensor 334 will not detect a flame. If the flame becomes longer than 15 cm, the base of the flame will be further than 7 mm from the inlet 360, so that the ionization sensor 334 will also no longer detect a flame. In both of the above cases, the controller 500 will deactivate the gas burner 302 of the gas burner unit 300. Also if the rotational speed of the ventilator 200 would drop again below the determined threshold value 510, the controller 500 will deactivate the burner 302 of the burner unit. The shown embodiment of the burner 302 offers the advantage that at reactivating the burner 302 after such deactivation of combustion, the burner can be quickly ignited again. The method described above for controlling the apparatus 10 is schematically shown in FIG. 23. It is clear that alternative embodiments are possible wherein this determined distance 350 is sufficiently large so that a flame of which the flame front does not reach beyond a determined distance 352, for example 5 cm or more, for example 10 cm or more, preferably 15 cm or more, upstream of the outflow opening 420, is detected and wherein this determined distance 350 is sufficiently small so that a flame of which the flame front reaches beyond this determined distance 352 upstream of the outflow opening 420, is not detected since the distance 354 to the base of such a flame is greater than this determined distance 350.

As shown further in FIGS. 1-23, the apparatus 10 could be controlled, for example, by a suitable controller 500, which controls the operation of various elements of the apparatus in function of suitable input elements, such as, for example, operator input means 520, sensors 502, 504, 330, etc., suitably coupled to this controller 500, which comprises an appropriate processor and memory means, programmed with suitable computer readable instructions, which, when executed by the processor, can output suitable control signals that the operation of elements such as the ventilator 200, the gas burner unit 300, etc. To achieve the desired method of controlling the apparatus 10, as, for example, described in greater detail below. It is clear that a similar method by means of such a controller 500 could also be provided for other embodiments of the device 10. According to a particularly advantageous method for controlling the device, as shown, for example, in FIGS. 1-22, an input element 520 for an operator 4, such as, for example, an activation switch for the ventilator 200 and/or a rotational speed controller for the ventilator 200, optionally supplemented with any other suitable input element, such as, for example, a temperature controller, etc. for the operator 4, wherein these one or more input elements 520 are coupled to the controller 500.

As shown, this input element 520 is preferably arranged in or near the handle 16 or grip of the device 10 for easy manipulation by the operator. When activating/deactivating or manipulating this input element 520, the controller 500 will control the ventilator 200, i.e. activate/deactivate the ventilator and/or control to a desired rotational speed and then activate and deactivate the gas burner 302 of the gas burner unit 300 as a function of this rotational speed. According to a specific embodiment, the rotational speed of the ventilator 200 can be controlled by the operator by means of the operating element 520, wherein the operator is able to vary the rotational speed according to the crop to be treated and/or the amount of crop to be combatted. It is clear that the ventilator 200 or the drive of the ventilator 200 hereby includes a suitable speed sensor coupled to the controller 500 in such a way that the controller 500 is able to determine the rotational speed of the ventilator 200.

Preferably, the gas burner 302 of the burner unit 300 is also coupled to the controller 500, for example by means of a suitable temperature sensor and/or an adjustable valve, pressure regulator, etc., for the gas supply, so that the controller 500 can automatically adjust the burner unit 300 to a desired temperature. Preferably, a temperature of 385° C. is chosen as this causes efficient combat of most crops, with a reduced risk of spontaneous combustion, however embodiments where the temperature is preferably variable between 150° C. and 400° C. are possible wherein the operator can control the temperature of the heated ambient air depending on the circumstances and the crop to be combatted.

The ventilator 200 is preferably configured to achieve a rotational speed at which the pressure of the air flow 12 is increased by at least 0.05 bar, preferably in the range of 0.1-2 bar. The ventilator 200 is further preferably configured to bring the flow rate of the air flow 12 to a value in the range of 0.3 m$^3$/s-7 m$^3$/s.

Figure 22:
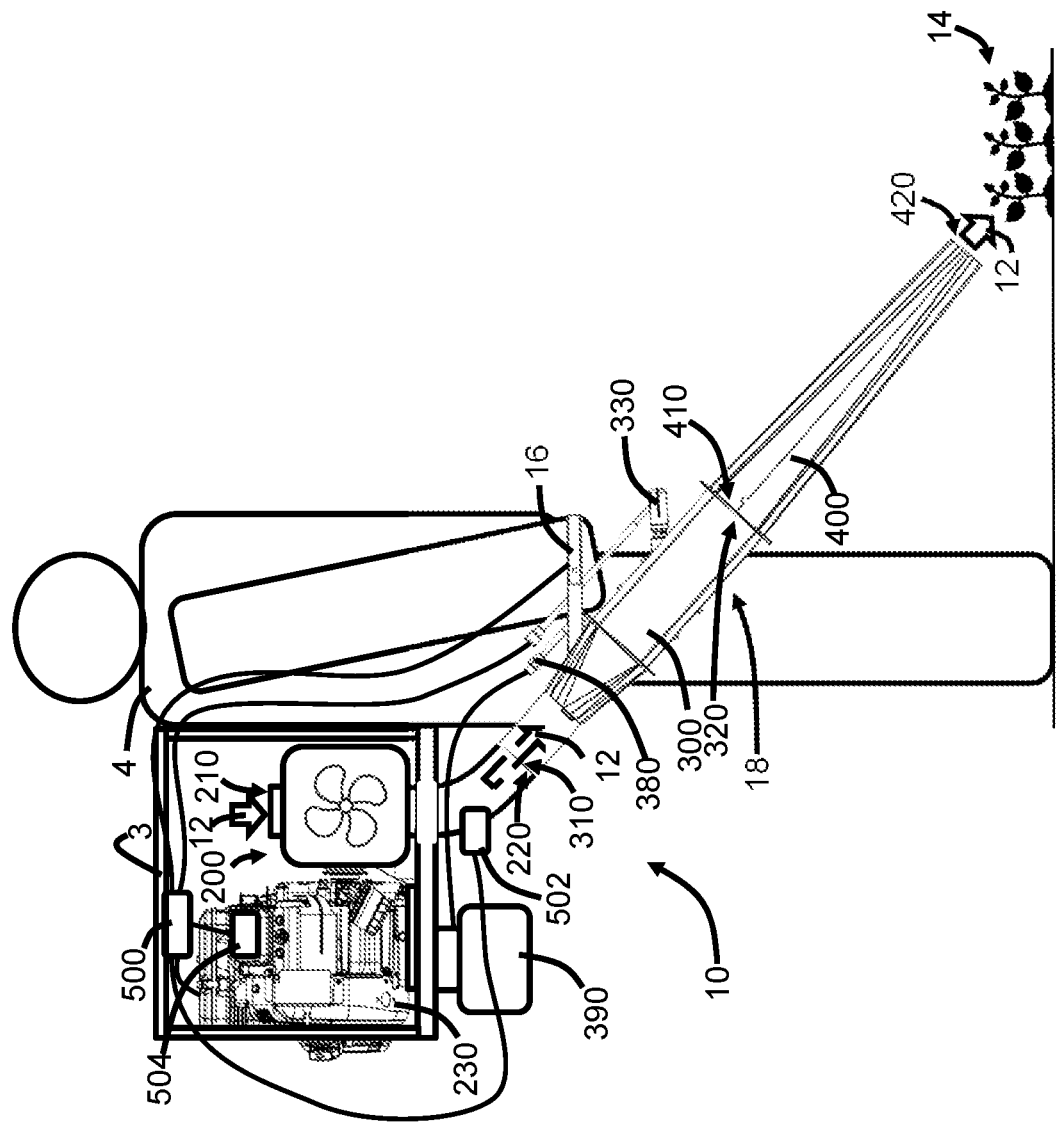
FIGS. 22 and 23 show an embodiment of a method according to the invention.
Figure 23:
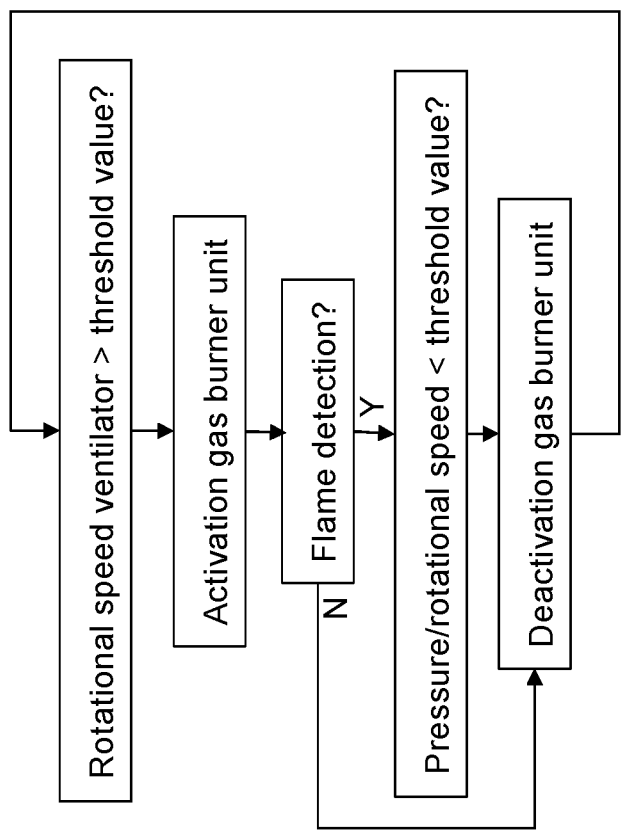

FIG. 22 shows an embodiment of an apparatus 10 similar as described above with respect to FIGS. 1-21 suitable for performing the method of combatting crops 14 by means of a heated air flow 12. Similar elements are indicated by similar references and comprise a similar structure and function as described above. As shown schematically, this embodiment comprises some elements adapted to allow portable use of the apparatus 10. Thus, as visible, the ventilator 200 was arranged on a suitable frame 3, which is, for example, portable on the back of an operator 4 while performing the above-described method using the apparatus 1. As visible, according to this embodiment, the drive 230 of the ventilator 200 is also arranged on the frame 3. It is clear, however, that alternative embodiments are possible, wherein one or more of the elements described above are arranged on the frame 3 by attachment to another element, rather than by direct attachment to the frame 3. Although the drive is shown here as a suitable combustion engine, it is clear that alternative embodiments are possible where the ventilator drive is, for example, electric. As shown in FIG. 22, the apparatus comprises an assembly 18 which is preferably executed in metal. This assembly 18 for use in an apparatus 10 is the only part of the apparatus which is exposed to the heated air flow 12, the other parts are only exposed to an air flow 12 of ambient temperature. Thus, as shown, the assembly 18 comprises the gas burner unit 300 and the outflow channel 400 coupled thereto. The assembly 18 forms a one-part portable unit and further includes a handle 16 to hold the assembly by hand and to carry it by hand during operation. In order to obtain a portable and light unit, it is advantageous that the length of the gas burner 302 of the burner unit 300 according to the flow direction of the air flow is in the range of 5-25 cm, for example 10 cm, and to limit the risk of flames reaching beyond the outflow opening 420, it is advantageous that the length of the outflow channel 400 according to the flow direction of the air flow ranges from 50 cm-200 cm, for example 100 cm. It is clear that alternative embodiments are possible, such as, for example, schematically shown in FIGS. 2 and 3, wherein the ventilator 200 is also part of the portable unit and is firmly connected to the assembly 18. Furthermore, such an embodiment also gives rise to an advantageous method for manufacturing the apparatus 10. Thereby, the burner 300 and the outflow channel 400 coupled thereto are manufactured as an assembly 18. As shown, this assembly 18, is manufactured as a one-part portable unit comprising a handle 16 configured to hold the assembly by hand and carry it by hand during operation. This assembly can then easily be coupled to a suitable ventilator and a controller to form the apparatus 10, wherein these additional parts do not have to be able to withstand the higher temperatures of the heated air flow.

Figure 24:
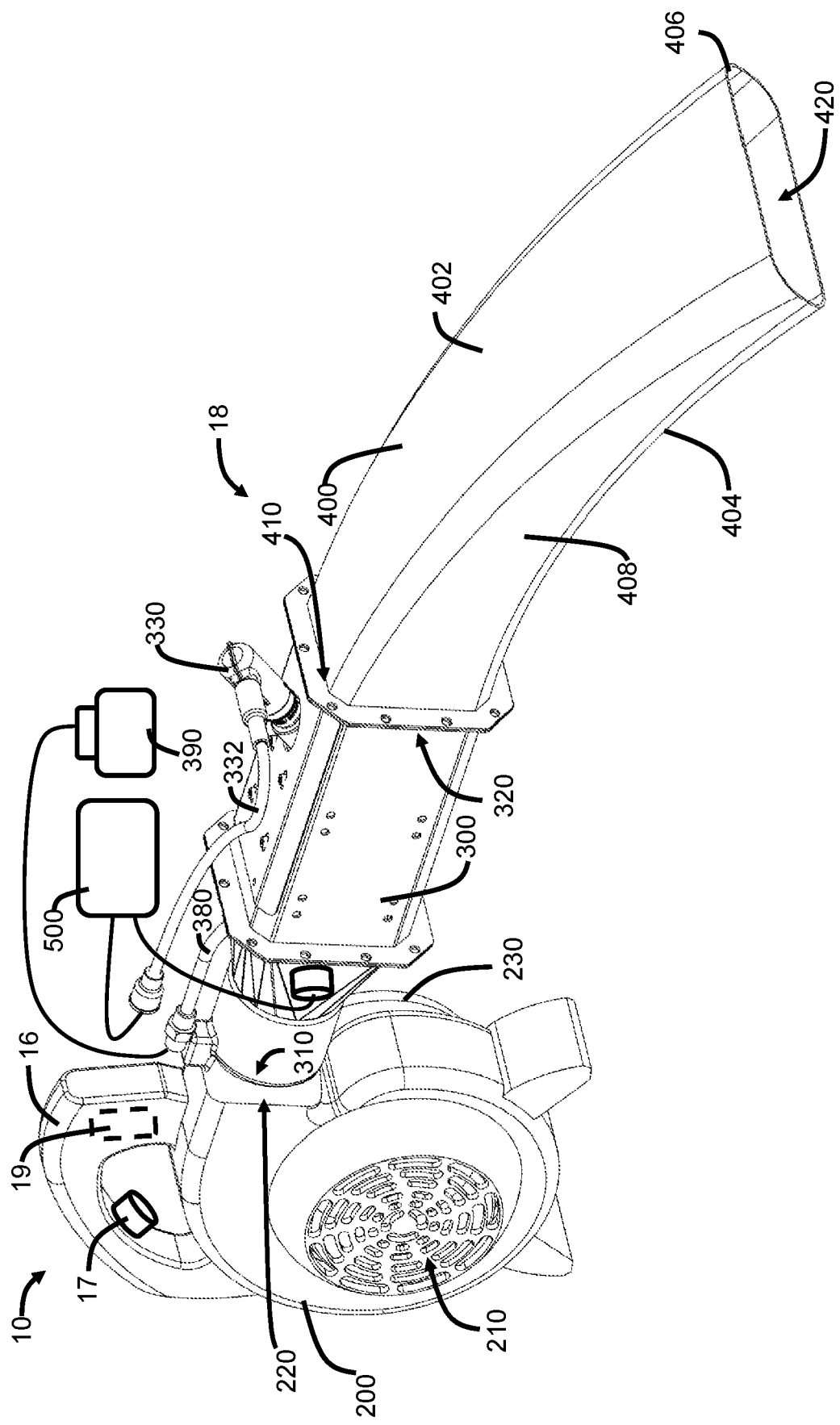
FIG. 24 shows an alternative embodiment of the apparatus.

It is furthermore clear that still further alternative embodiments are possible as shown, for example, in FIG. 24, wherein similar elements were indicated by similar references and function similarly as in the embodiments described above. As shown, the outflow channel 400 comprises a slightly downwardly curved shape unlike the above described embodiments. This makes it possible, for example, to blow the heated air flow at a greater angle relative to the soil surface on the crops to be combatted. As shown further, according to this embodiment, which forms a one-part portable unit, also comprises a ventilator 200 structurally connected to the assembly 18. As shown, this allows, for example, to arrange the handle 16 on the housing of the ventilator 200 as shown, or to use an existing portable ventilator 200 already provided with a handle 16 for portable use. Such ventilators are available, for example, for use in apparatuses such as leaf blowers and the like. Thus, the shown embodiment of the portable apparatus 10 can be manufactured in a simple way by coupling such a portable ventilator 200 to an assembly 18 consisting of a burner unit 300 and an outflow channel 400 as shown and/or described above. It is clear that the embodiment of FIG. 24 also comprises a suitable controller 500 which is preferably coupled to a suitable sensor which, as shown, is arranged in the air flow 12 generated by the ventilator 200. As shown, this sensor 502 is preferably arranged on the assembly 18 upstream of the gas burner 302 of the gas burner unit 300 since the air flow there is not yet heated and thus a sensor 502 may be used which may not necessarily be able to withstand such higher temperatures. In other words, the pressure sensor 502 is also part of the assembly 18. According to the shown embodiment, the sensor 502 is suitably connected to the controller 500, similar to that described above, as is, for example, the flame detector 330, which forms also the electronic igniter of the gas burner 302. An advantage of such an embodiment is that the controller 500 can control the apparatus 10 as described above based on the measurements of the pressure sensor 502 without requiring a direct coupling to the ventilator 200. This facilitates the manufacturing of such a portable one-part unit, since often such a portable ventilator 200 also has an operating element 17 arranged on the handle 19, such as a push button, a control button, a throttle, . . . , which is configured to activate and deactivate the ventilator 200 and/or to control the rotational speed of the ventilator 200. Such a portable ventilator 200 is preferably already provided with a drive element 230, such as, for example, a suitable electric engine, but it is clear that other engines, such as, for example, a gas engine, a petrol engine, etc. are also possible. Furthermore, as schematically shown, the portable ventilator 200 also already comprises a suitable controller 19 which is, for example, operatively connected to the operating element 17 and the drive for activating, deactivating and/or controlling the rotational speed of the ventilator 200. It is clear that this embodiment, wherein the apparatus 10 can be achieved on the basis of such an embodiment of the ventilator 200, which as a unit can function independently of the assembly 18 coupled thereto with the burner unit 300 and the outflow channel 400, the sensors 502, 330 and the controller 500 which can also function as a unit independently of the ventilator 200, permits a simple method of manufacturing such an apparatus 10. Since use can be made of such a fully functional portable ventilator 200, which can also be used for other applications, and a fully functional assembly 18, which only have to be coupled together at the level of the outlet opening 220 of the ventilator 200 and the inlet opening 310 of the burner unit 300, without requiring further interaction between the controllers 500 of the assembly 18 and the controller of the ventilator 200, provides an efficient and flexible method for manufacturing the apparatus 10. This also allows, depending on the desired application, combine different types of ventilators 200 with different types of assembly 18 in order to flexibly enable a large number of suitable combinations in function of the desired application of the apparatus 10. The modular aspect of such an embodiment also ensures that the ventilator or the assembly can be replaced in a simple way in case of a defect and/or adjusted in function of a change in the desired application.

It is clear that variant embodiments and combinations of the above-described embodiments are possible without departing from the scope of protection defined in the claims.

The invention claimed is:

1. An apparatus for combating crops with heated air comprising:
   a ventilator configured to generate an air flow;
   a gas burner unit configured to heat the air flow generated by the ventilator;
   an outflow channel configured to receive the air flow heated by the gas burner unit and guide it through the outflow channel to an outflow opening where the crops to be combatted are exposed to the heated air flow;
   a controller operatively connected to the gas burner unit, wherein:
   the apparatus further comprises a sensor operatively connected to the controller which is arranged in the air flow and is configured to monitor a pressure and/or a flow rate of the air flow generated by the ventilator; and in that:
   the controller is configured to:
   only activate the gas burner unit if the pressure or the flow rate of the air flow generated by the ventilator is more than a determined threshold value; and
   deactivate the gas burner unit again if the pressure and/or the flow rate of the air flow generated by the ventilator is less than the determined threshold value.

2. The apparatus according to claim 1, wherein the apparatus further comprises a sensor operatively connected to the controller configured to monitor a rotational speed of the ventilator;
   and in that
   the controller is further configured to:
   only activate the gas burner unit if the rotational speed of the ventilator is greater than a determined rotational speed threshold value; and
   deactivate the gas burner unit again if the rotational speed of the ventilator is less than the determined rotational speed threshold value.

3. The apparatus according to claim 1, wherein the apparatus further comprises an operating element coupled to the controller which is configured to:
   activate and deactivate the ventilator; and/or
   control a rotational speed of the ventilator, and
   wherein the controller is further configured to control the gas burner unit in response to signals from the sensor for the pressure and/or the flow rate of the generated air flow and/or the sensor for the rotational speed of the ventilator.

4. The apparatus according to claim 2, wherein the controller is further configured, to run the ventilator at a determined idle rotational speed that is lower than the determined rotational speed threshold value, at least for a determined period of time after deactivation of the gas burner unit.

5. The apparatus according to claim 1, wherein the apparatus further comprises at least one flame detector coupled to the controller which is positioned in a combustion chamber of the gas burner of the gas burner unit at a determined distance from a fuel input:
   wherein the determined distance is sufficiently large, so that a flame, of which a flame front is not reaching beyond a determined distance upstream of the outflow opening, is detected; and
   wherein the determined distance is sufficiently small, so that a flame, of which the flame front is reaching beyond the determined distance upstream of the outflow opening is not detected, since the distance from the fuel input to a base of the flame is greater than the determined distance, and
   wherein the controller is configured to deactivate the gas burner unit if the at least one flame detector is not detecting a flame.

6. The apparatus according to claim 5, wherein the at least one flame detector comprises an ionization sensor.

7. An assembly for use in an apparatus according to claim 1, wherein:
   the assembly comprises the gas burner unit and the outflow channel coupled thereto;
   the assembly forms a one-part portable unit and further comprises a handle configured to allow an operator to hold the assembly by hand and to carry it by hand during operation;
   wherein length of the gas burner of the burner unit according to a flow direction of the air flow is in the range of 5-25 cm; and
   wherein length of the outflow channel according to the flow direction of the air flow is in the range of 50 cm-200 cm.

8. A method for controlling an apparatus according to claim 1 wherein the sensor monitors a pressure and/or a flow rate of the air flow generated by the ventilator, the method comprising:
   using the controller, only activating the gas burner unit if the pressure or the flow rate of the air flow generated by the ventilator is greater than the determined threshold value; and
   using the controller, deactivating the gas burner unit again if the pressure and/or the flow rate of the air flow generated by the ventilator is less than the determined threshold value.

9. The method according to claim 8, wherein the controller:
   only activates the gas burner unit if a rotational speed of the ventilator is greater than a predetermined threshold value; and
   deactivates the gas burner unit again if the rotational speed of the ventilator is less than the predetermined threshold value.

10. The method according to claim 8, wherein the controller controls the gas burner unit in function of the sensor for the pressure and/or the flow rate of the generated air flow and/or the sensor for a rotational speed of the ventilator.

11. The method according to claim 8, wherein the controller causes the ventilator run at a determined idle rotational speed that is less than the determined threshold value, at least for a determined period of time after deactivation of the gas burner unit.

12. The method according to claim 8, wherein the controller deactivates the gas burner unit if a flame detector is not detecting a flame, and
   wherein the flame detector is positioned in a combustion chamber of the gas burner of the gas burner unit at a certain distance from fuel input:

wherein a determined distance is sufficiently large, so that a flame, of which a flame front is not reaching beyond a determined distance upstream of the outflow opening, is detected; and wherein the determined distance is sufficiently small so that a flame, of which the flame front is reaching beyond the determined distance upstream of the outflow opening is not detected, since the distance from the fuel input to a base of the flame is larger than the determined distance.

13. The method according to claim 12, wherein the flame detector comprises an ionization sensor.

14. A method for manufacturing the apparatus according to claim 1, the method comprising:

coupling the gas burner unit and the outflow channel to provide an assembly; and manufacturing the assembly as a one-part portable unit comprising a handle configured to allow an operator to hold the assembly by hand and carry it by hand during operation;

wherein length of the gas burner of the gas burner unit according to a flow direction of the air flow is in the range of 5-25 cm; and wherein length of the outflow channel according to the outflow direction of the air flow is in the range of 50 cm-200 cm.

* * * * *